United States Patent
Brandwine et al.

(10) Patent No.: US 9,530,020 B2
(45) Date of Patent: Dec. 27, 2016

(54) USE OF FREEFORM METADATA FOR ACCESS CONTROL

(71) Applicant: Amazon Technologies, Inc., Reno, NV (US)

(72) Inventors: Eric Jason Brandwine, Haymarket, VA (US); Peter Nicholas DeSantis, Seattle, WA (US); Léon Thrane, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 17 days.

(21) Appl. No.: 13/747,224

(22) Filed: Jan. 22, 2013

(65) Prior Publication Data

US 2014/0208414 A1    Jul. 24, 2014

(51) Int. Cl.
*G06F 7/04* (2006.01)
*G06F 21/62* (2013.01)

(52) U.S. Cl.
CPC ... *G06F 21/6218* (2013.01); *G06F 2221/2149* (2013.01)

(58) Field of Classification Search
CPC ............. G06F 2221/2149; G06F 21/6218
USPC ........................................ 726/26–30
See application file for complete search history.

(56) References Cited

U.S. PATENT DOCUMENTS

| | | | |
|---|---|---|---|
| 7,747,647 B2 | 6/2010 | Canning | |
| 8,447,829 B1 | 5/2013 | Geller et al. | |
| 8,463,815 B1 | 6/2013 | Zoellner | |
| 8,805,882 B2 | 8/2014 | Lewis et al. | |
| 2002/0077988 A1* | 6/2002 | Sasaki | G06F 21/10 705/59 |
| 2003/0084286 A1* | 5/2003 | Bader | G06F 21/121 713/165 |
| 2007/0156842 A1* | 7/2007 | Vermeulen | G06F 17/30212 709/217 |
| 2007/0180519 A1* | 8/2007 | Boccon-Gibod | G06F 21/10 726/21 |
| 2007/0285241 A1 | 12/2007 | Griebenow et al. | |
| 2008/0133486 A1 | 6/2008 | Fitzgerald | |
| 2010/0031374 A1* | 2/2010 | Jung | G06F 21/10 726/30 |

(Continued)

FOREIGN PATENT DOCUMENTS

| | | |
|---|---|---|
| CN | 104995598 A | 10/2015 |
| IN | 6476/DELNP/2015 | 6/2016 |
| JP | 2016-507839 | 3/2016 |

OTHER PUBLICATIONS

Khaled et al., "A Token-Based Access Control System for RDF Data in the Clouds," Cloud Computing Technology and Science (CloudCom), 2010 IEEE Second International Conference on Year: 2010 pp. 104-111.*

(Continued)

*Primary Examiner* — Roderick Tolentino
(74) *Attorney, Agent, or Firm* — Hogan Lovells US LLP

(57) ABSTRACT

Approaches are described for security and access control for computing resources. Various embodiments utilize metadata, e.g., tags that can be applied to one or more computing resources (e.g., virtual machines, host computing devices, applications, databases, etc.) to control access to these and/or other computing resources. In various embodiments, the tags and access control policies described herein can be utilized in a multitenant shared resource environment.

17 Claims, 10 Drawing Sheets

(56) References Cited

U.S. PATENT DOCUMENTS

| | | | | |
|---|---|---|---|---|
| 2010/0161436 | A1* | 6/2010 | Itskov | G06Q 30/0601 705/26.1 |
| 2011/0126281 | A1* | 5/2011 | Ben-Zvi | G06F 21/6218 726/21 |
| 2011/0280390 | A1* | 11/2011 | Lawson | G06F 9/5077 379/220.01 |
| 2011/0321122 | A1 | 12/2011 | Mwangi | |
| 2012/0117610 | A1 | 5/2012 | Pandya | |
| 2012/0224057 | A1* | 9/2012 | Gill | G06F 21/55 348/143 |
| 2012/0233668 | A1 | 9/2012 | Leafe et al. | |
| 2014/0068074 | A1* | 3/2014 | Goyal | H04L 67/1097 709/225 |

OTHER PUBLICATIONS

Le et al., "Access rule consistency in cooperative data access environment," Collaborative Computing: Networking, Applications and Worksharing (CollaborateCom), 2012 8th International Conference on Year: 2012 pp. 11-20.*
PCT International Search Report and Written Opinion dated Jun. 16, 2014, for International Application No. PCT/US2014/012609 filed Jan. 22, 2014, 8 pages.
USPTO Non-Final Office Action dated Mar. 28, 2014, for U.S. Appl. No. 13/747,261, filed Jan. 22, 2013, 21 pages.
USPTO Final Office Action dated Oct. 3, 2014, for U.S. Appl. No. 13/747,261, filed Jan. 22, 2013, 18 pages.
"Final Office Action dated Mar. 30, 2015," U.S. Appl. No. 13/747,239.
"Non-Final Office Action dated Jun. 18, 2015," U.S. Appl. No. 13/747,261.
"International Search Report and Written Opinion dated Jun. 16, 2014," International Application No. PCT/US2014/012609.
"Extended European Search Report dated Aug. 16, 2016" received in European Application 14743205.8.
"Final Office Action dated Jun. 27, 2016" received in U.S. Appl. No. 13/747,239.
US Non-Final Office Action dated Dec. 18, 2015 issued in U.S. Appl. No. 13/747,239.
US Final Office Action dated Feb. 1, 2016 issued in U.S. Appl. No. 13/747,261.
Australian Patent Examination Report No. 1 for Patent Application No. 2014209475 dated Apr. 6, 2016, 3 pages.
International Preliminary Report for Patentability for Patent Application No. PCT/US2014/012609 dated Jul. 28, 2015, 6 pages.
CA Office Action dated Jun. 9, 2016 issued in Application Serial No. 2,898,909, 3 pages.

* cited by examiner

USE OF FREEFORM METADATA FOR ACCESS CONTROL

BACKGROUND

With the recent explosion of social media and interactive services, the use of tags and other metadata is becoming prevalent across many different platforms and services. Tags are usually implemented as keywords or terms assigned to a piece of information (e.g., a computer file, a service, a digital image, etc.). This kind of metadata can help describe an item and to attach context information to it. Tags are generally chosen informally and personally by the item's creator or by some other user. For example, in the context of social networking, users frequently attach tags to photographs, videos and other media assets in order to describe the subject of the asset or to provide some other context information to the asset. Tagging is not limited to media, however, in that it can be utilized in conjunction with many different types of resources and services. For example, tagging can be utilized in the context of multitenant environments and other shared resource technologies, such as cloud computing.

BRIEF DESCRIPTION OF THE DRAWINGS

Various embodiments in accordance with the present disclosure will be described with reference to the drawings, in which.

DETAILED DESCRIPTION

Figure 1:
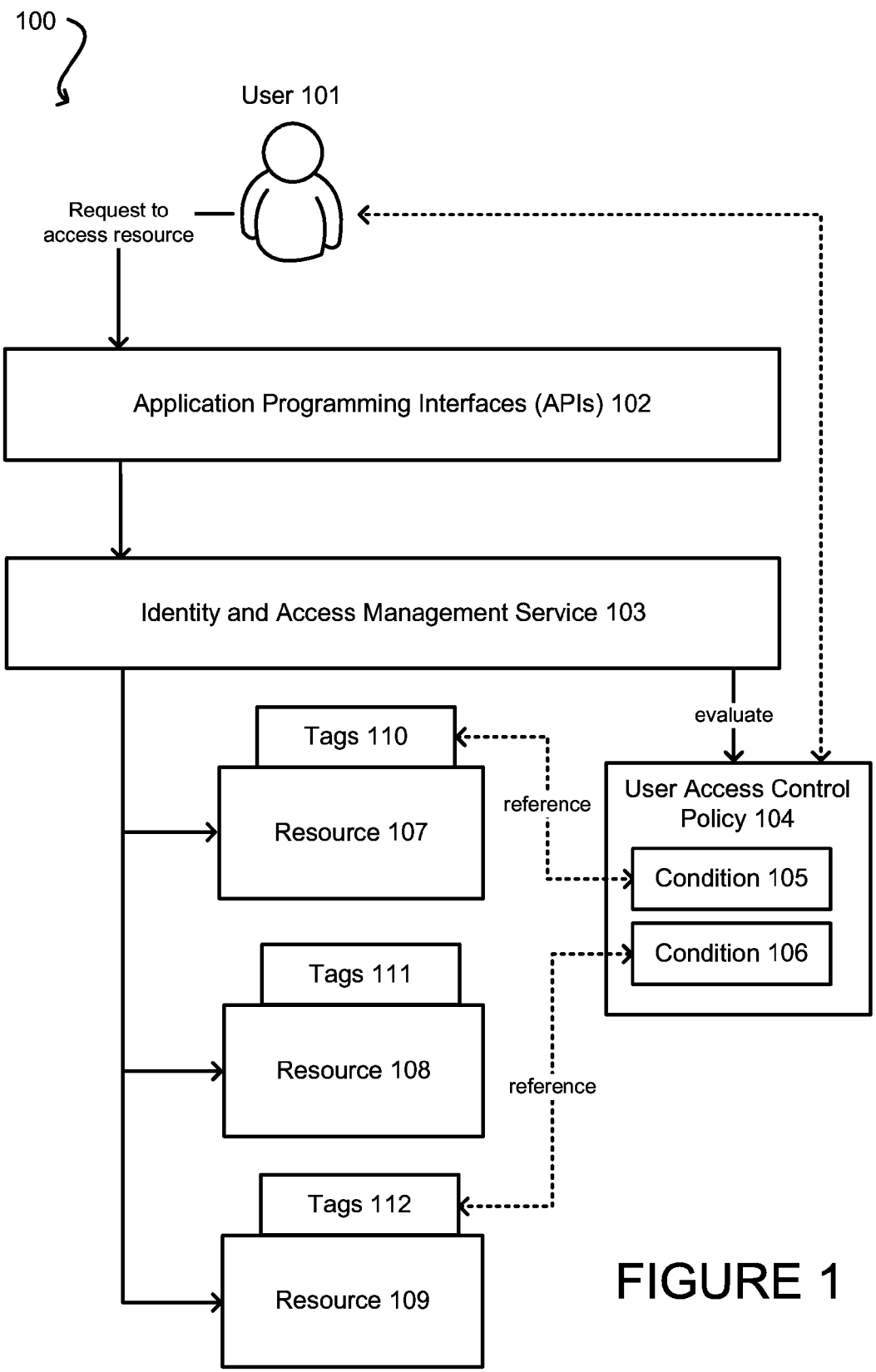
FIG. 1 illustrates an example of allowing a customer to reference tags in access control policies, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for providing freeform metadata, such as tags for computing resources. In particular, various embodiments utilize freeform metadata to control access to various computing resources (e.g., virtual machines, storage, applications, databases, etc.) via a web service interface. In various embodiments, the freeform metadata described herein can be utilized in a private or multitenant computing environment (e.g., cloud computing environment), where an operator of the computing environment (e.g., a service provider or organization) allows users (e.g., customers, students, employees, etc.) to execute their applications and services on the resources (e.g., servers) of the service provider. In this environment, users are allowed to assign tags to various resources in the computing environment. For example, users can tag virtual machine (VM) instances that run their applications, host computing devices that host those VM instances, data stored in a data storage service, applications, databases, interfaces, virtual networks comprised of multiple virtual machines and various other resources.

In this context, the freeform metadata tagging can be any freeform, arbitrary and unstructured metadata associated with resources that can be used for any number of purposes. In one embodiment, each tag in the computing environment can comprise a freeform character string that specifies a key and value (e.g., a key-value pair) that is associated with a particular resource. For example, rather than selecting from a predefined set of keys or values, the user may tag a computing resource with a character string of any format that specifies any arbitrary key and value.

In accordance with one embodiment, once the user has assigned one or more tags to a computing resource, those tags can be referred to as predicates in access control policies that are associated with the user. For example, an administrator of an account may have a policy allowing a particular user to delete any resource tagged with the user defined tag "stack=production" (i.e., the user is allowed to delete any resource that is part of the production stack). This can be advantageous because the administrator may already have the appropriate tags (or other metadata) in place for other reasons and, using techniques described herein, these tags can be utilized for resolving requests for access control. In addition, the administrator can control the access rights of the user without having to explicitly list each resource that the user should be able to delete in the user's access control policy. Since tags can be applied to anything, the user can be granted access to heterogeneous resources (e.g., VM instances, storage, applications, databases, etc.) that may reside in different places in the computing environment and be accessible in different ways. When the system receives a request from the user (e.g., an application programming interface ("API") call) to perform an operation on a resource, the system can evaluate the access control policy associated with the user and/or resource and resolve the request (i.e., to come to a determination as to whether to grant or deny the request) based on whether the user request specifies an operation authorized by the access control policy (e.g., delete) and the resource has been associated with the appropriate tag (e.g., the "stack=production" tag).

In accordance with the same or another embodiment, the application of certain tags to resources can be restricted (i.e., by setting access control policies on the use of tags). If anyone were allowed to freely modify any tag of a resource, then a user having tagging privileges would be able to tag any or all resources with a tag that grants the user access, enabling the user to obtain unintended access to resources in the system. In many situations this can be undesirable. As a result, in various embodiments the setting of certain resource tags can be restricted and controlled based on at least one policy, rule set, or other such mechanism. In this embodiment, an access control policy can be created that specifies the principals that are allowed to assign one or more tags to resources. In some embodiments, the access control can be implemented as an access control list (ACL) associated with a tag. When a request (e.g., an API request) to add a tag to a resource is received from a user, the system can evaluate the access control list associated with the tag and determine whether the user is allowed to assign the tag to the resource. If the access control list allows the addition of the tag, the request is granted, otherwise the request can be denied. In some embodiments, globs, regular expressions and/or other string matching algorithms can be used to specify which users are allowed to add particular tags to the resources. Because each tag can be comprised of a key and value pair, the restrictions in the access control policy can be based on ether (1) a combination of a specific key and a specific value, or (2) based on a specific key regardless of any value that may be associated with it. In some embodiments there may be exceptions to the restrictions for specific keys or key-value pairs. For example, individual users in the system may be allowed to add any tag to an application (e.g., "application=*"), but may not be able to add tags to the stack resources (e.g., "stack=*") that are used to run the application, with the exception that software developers are allowed to tag certain stack resources as testing resources (e.g., "stack=testing"). It should be noted that any examples of tags described in this specification is provided purely for purposes of illustration and is not intended to limit the embodiments described herein.

In accordance with another embodiment, tags can be used to attach an access control policy to a resource. In this embodiment, a tag can be associated with a policy. When the tag is added to a particular resource, the policy is applied to that resource. Similarly, when the tag is removed from the resource, the access control policy is also removed from the resource. In this manner, rather than associating the access control policy with a particular principal or resource, the policy can be associated with freeform metadata. This can allow a customer to select a resource and specify which users are able to access that resource (e.g., by adding a tag that uses a regular expression) without having to iterate across every resource and associate the policy with each resource. Because the mapping of the tag with the policy is resolved at policy evaluation time, the policies are up to date.

FIG. 1 illustrates an example 100 of allowing a customer to reference tags in access control policies, in accordance with various embodiments. In the illustrated embodiment, the customer of the service provider can specify tags (110, 112) as predicates in the conditions (105, 106) of the access control policy 104 associated with a user 101. For example, a user "Bob" may have a policy that specifies that "Bob" can delete anything tagged with the tag "stack=production".

Because the tags (110, 111, 112) can be applied to any resource (107, 108, 109) on the system, the user "Bob" can be granted access to any heterogeneous resource that is tagged with that tag. This allows the customer's permission model to be expressed in a freeform and unstructured manner.

In accordance with an embodiment, once the customer has specified certain tags in the user's access control policy 104, those tags can be used to control permissions of the user when authorizing various operations on the resources. For example, if the user's policy states that the user 101 is allowed to delete any resource tagged with tag 110, and if the resource 107 is tagged with tag 110, then the user would be allowed by the system to delete resource 107. Similarly, if the policy 104 states that the user 101 is allowed to modify any resource tagged with tag 112, and if the resource 109 is tagged with tag 112, then the user would be allowed by the system to modify resource 109. As previously mentioned, the tag can be associated with any resource in the computing environment, including but not limited to virtual machines, host computing devices, data storage, applications, databases, virtual networks, or interfaces. In various embodiments, an interface can be a virtual network interface with an internet protocol (IP) address and security group information.

In accordance with an embodiment, when the user 101 submits a request using the application programming interfaces (APIs) 102 to access a resource, an identity and access management service 103 can retrieve all of the access control policies relevant to the request and evaluate them. For example, the user 101 has an access control policy 104 that specifies various restrictions for the user accessing resources. Similarly, there may be access control policies associated with the user's group, the particular resource being accessed, or the tag itself, as will be described in further detail in the remaining portions of this disclosure. In one embodiment, the identity and access management service 103 can collect all of the relevant policies, concatenate them together and evaluate them to determine whether the grant the API request.

In various embodiments, a policy language can be provided by the service provider to allow the customer to express the conditions in the user's access control policy 104. The language can be extended such that a user (e.g., customer of the service provider) can reference tags as conditions (105, 106). For example, the user "Bob" may be an administrator that is allowed to do anything to the production infrastructure. Thus, as specified in policy 104, "Bob" can perform any action on any resource, when the resource is tagged with the tag "stack=production". In this case, the customer can tag a virtual machine instance, host computing device, storage resources and other resources with the tag "stack=production". As a result, "Bob" can manage the VM instance, host computing device and storage resources even though these resources may be stored in different parts of the system and perform different functions. Therefore, the user "Bob" can have permissions that are applied heterogeneously and expressed homogenously. This use of tags provides a flexible way to group permissions across arbitrary boundaries between resources.

In some cases, however, if any user is allowed to freely modify any tag on any resource, then users can bypass some security measures by tagging the resources with the tag that grants them access to resources. For example, if the user's policy states that the user is allowed to modify any resource tagged with the tag "stack=production," and if there are no restrictions to applying that tag, then the user can gain access to any resource in the system by simply tagging each resource with the tag "stack=production." In many situations, this can be undesirable.

Figure 2:
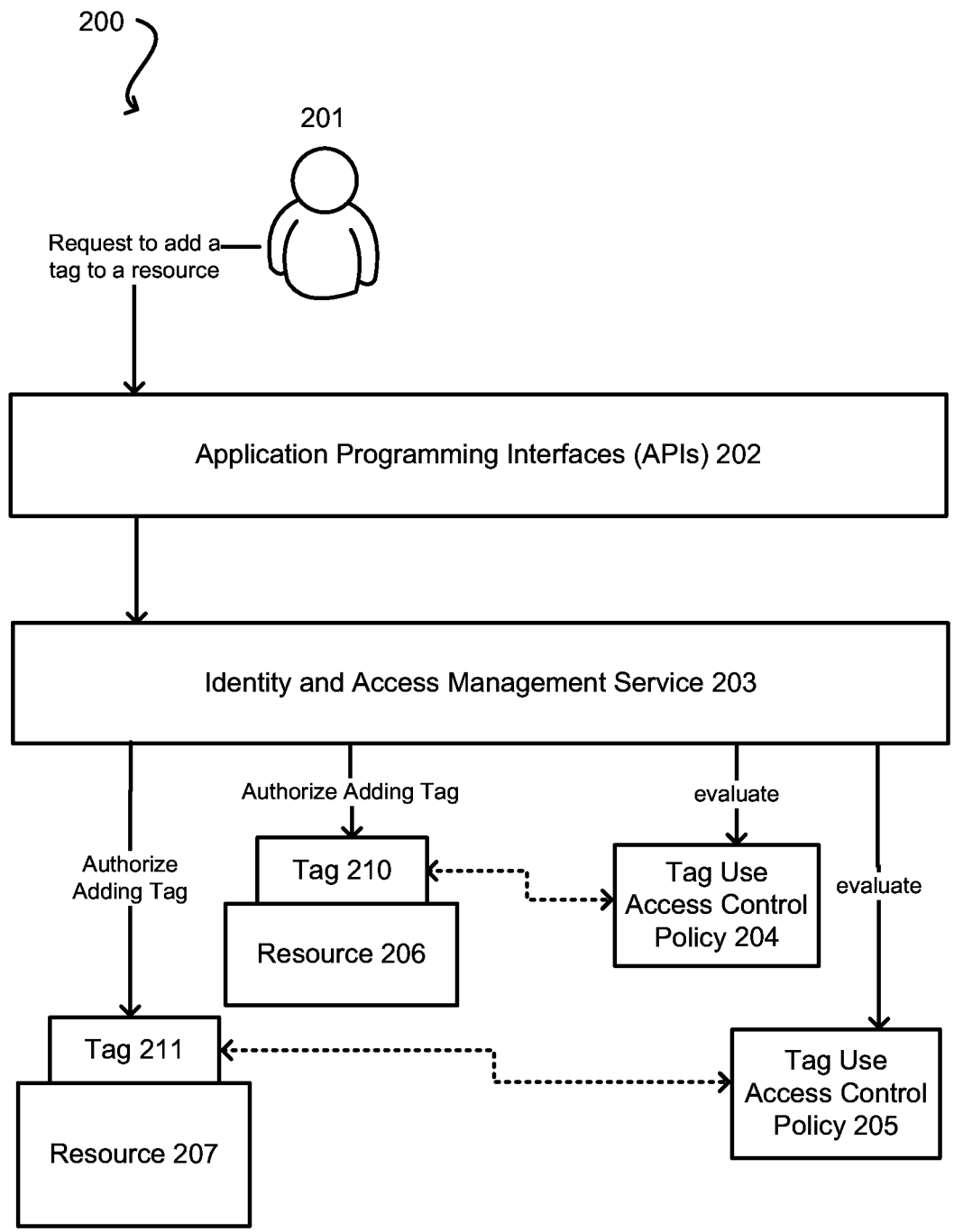
FIG. 2 illustrates an example of utilizing access control policies to restrict the use of tags on resources, in accordance with various embodiments.

FIG. 2 illustrates an example 200 of utilizing access control policies to restrict the use of tags on resources, in accordance with various embodiments. In the illustrated embodiment, a tag is a first order object that can have an access control policy associated with it. For example, tag 210 is associated with tag use access control policy 204 and tag 211 is associated with tag use access control policy 205. In accordance with an embodiment, the tag use access control policy specifies which principals (e.g., users) are allowed to apply the tag to which resources. For example, the tag "stack=production" can be associated with a policy that states that only the system administrator or other privileged user can tag a resource with this particular tag. It should be noted that in various embodiments, not all tags have an access control policy associated with it. Many tags (e.g., description terms, etc.) can be added freely with no restrictions and therefore do not need to be associated with an access control policy.

Tags can be comprised of a key value pair. In some embodiments, the access control policy applied to the tag can be based on both the key and the value. For example, the tag "color=green" can be restricted based on both the key (e.g., color) and the value (e.g., green). In other embodiments, the access control policy applied to the tag can be based on only the key, without regard to the specific value. For example, the tag "color=*" can be associated with an access control policy, where any tag that contains the key (e.g., color) will be subject to the access control policy. In some embodiments, there may be exceptions to the access control policy. For example, the access control policy may specify that no individual user is allowed to assign the tag "stack=*" with the exception that users that are software developers are allowed to assign the tag "stack=testing".

In accordance with the illustrated embodiment, when the user 201 submits a request (e.g., using API 202) to assign a tag to a particular resource, the identity and access management service 203 can evaluate the access control policy associated with that tag. For example, if the user submits a request to add tag 210 to resource 206, the identity and access management service 203 can evaluate the tag and use access control policy 204 and determine whether the user 101 is allowed to apply the tag to the resource. Similarly, if the user submits a request to add tag 211 to resource 207, the identity and access management service 203 can evaluate the tag use access control policy 205 and determine whether the user 101 is allowed to apply the tag. If the policy allows the user to assign the tag, the tag can be associated with the resource, otherwise the request fails.

In some embodiments, globs (e.g., pattern matching) regular expressions, or other string matching techniques can be used to control which principals (e.g., users) can set which tags. For example, the user "Bob" may be allowed to set tags that match a particular regular expression or glob. If a customer has a directory structure, that structure can be used to specify restrictions on the tags that can be set by a user. For example, the user may be granted permissions to manage tags for resources in the directory "company/department/project/system/hostID/*". Another example could be a regular expression, where a user may be allowed to apply tags to resources in the directory of any department whose title begins with a particular letter and contains exactly 4 numbers. Any number of regular expressions can be utilized within the scope of the various embodiments, as will be evident to one of ordinary skill in the art based on the teachings of this disclosure.

Figure 3:
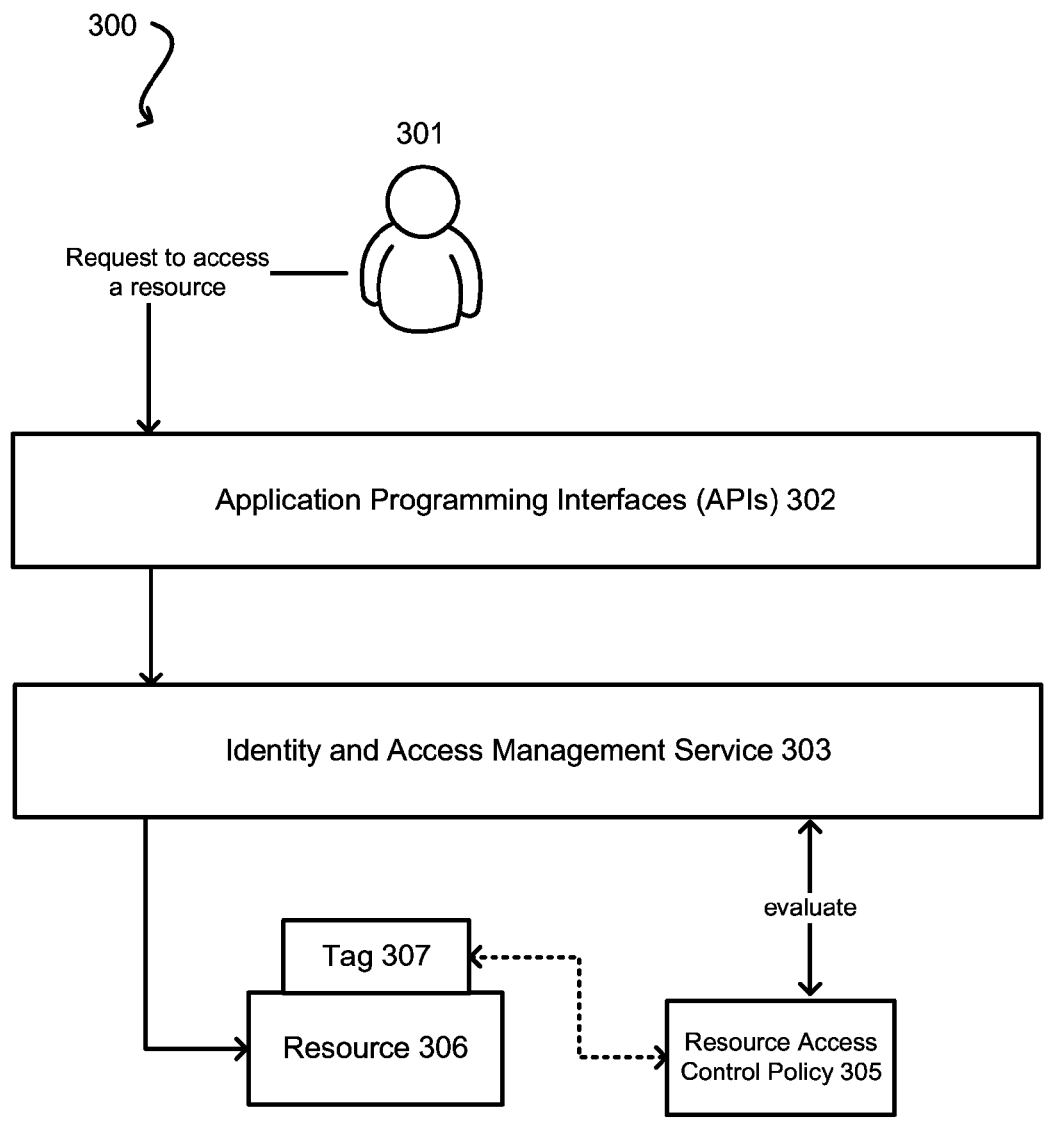
FIG. 3 illustrates an example of associating a resource access control policy with a computing resource as a result of assigning a tag to that computing resource, in accordance with various embodiments.

FIG. 3 illustrates an example 300 of associating a resource access control policy with a computing resource as a result of assigning a tag to that computing resource, in accordance with various embodiments. In the illustrated embodiment, a tag 307 can be associated with a resource access control policy 305. The resource access control policy 305 specifies which users can perform operations on a resource that will be tagged with tag 307. In various embodiments, when a user first submits a request to add the tag 307 to a resource, the system can determine whether the user is allowed to add the tag and then add the tag to the resource if the user does have appropriate permission to add the tag. If the tag is added to the resource, the resource access control policy associated with the tag will be evaluated as part of any request to access the resource.

In accordance with the illustrated embodiment, when the user 301 submits a request to access resource 306, the identity and access management service 303 can collect all of the access control policies relevant to the request (e.g., user's access control policy, resource access control policy 305, etc.) and evaluate them. As a result of the tag 307 being applied to the resource 306, whenever any request is received to access resource 306, the resource access control policy 305 will be evaluated as part of controlling access to that request. Similarly, if the tag 307 is ever removed from the resource 306, the resource access control policy 305 will no longer be evaluated for incoming requests to access resource 306.

In this manner, rather than explicitly associating the access control policy with a particular resource, the policy 305 can be associated with any resources, by virtue of the tag being applied to the resource. This can allow a customer to select a resource and specify which users are able to access that resource (e.g., by adding a tag that uses a regular expression) without having to iterate across every resource and associate the policy with each resource. Because the mapping of the tag with the policy is resolved at policy evaluation time, the policies are up to date.

It should be noted that although FIGS. 1-3 illustrate an identity and access management service, this is not a limitation to the various embodiments described herein. In alternative embodiments, any other component of the system (or combination of multiple components) can be used to evaluate policies, assign tags and perform other functions described herein.

Figure 4A:
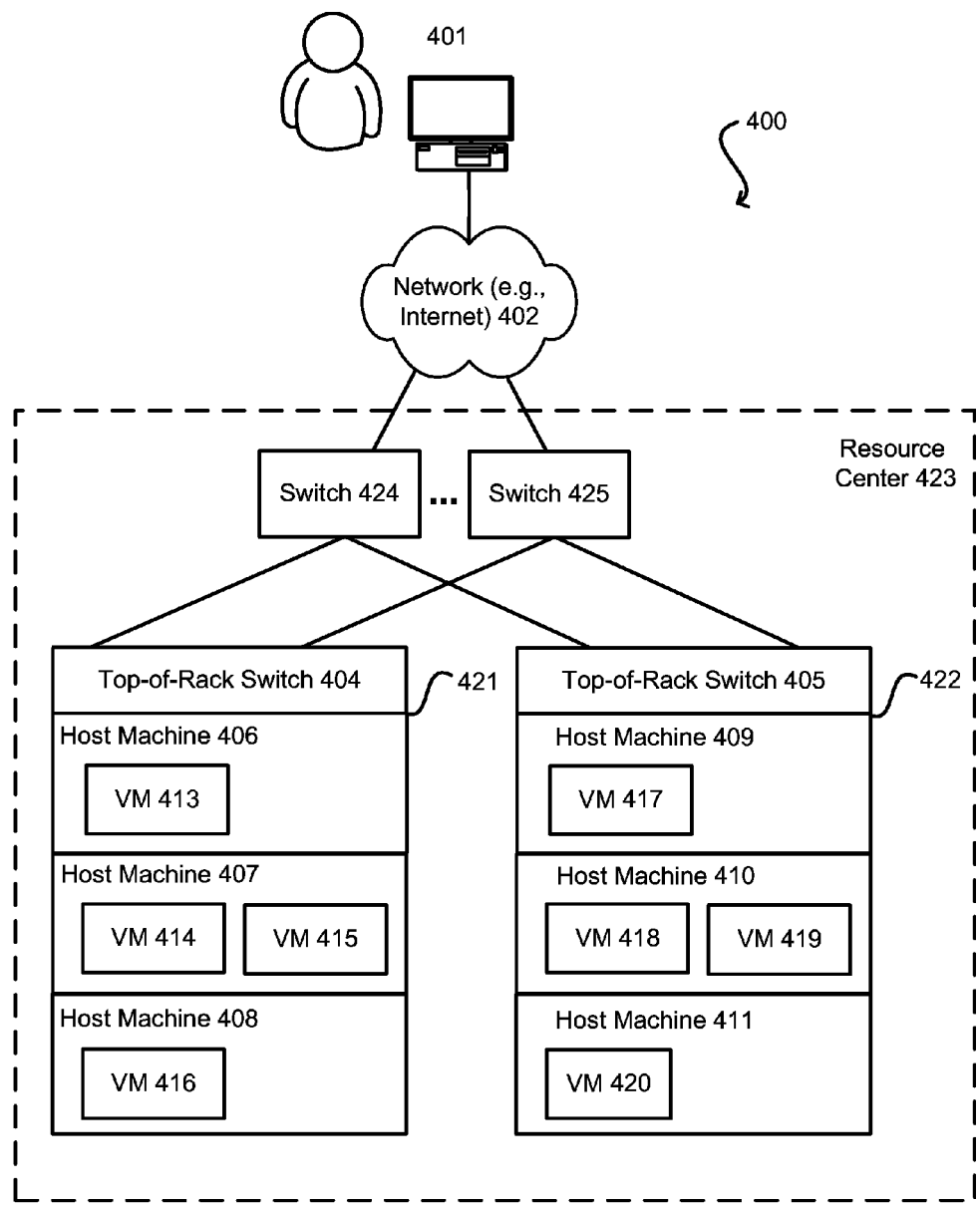
FIG. 4A illustrates an example of a resource center environment of the service provider that provides computing resources for a customer, in accordance with various embodiments.

FIG. 4A illustrates an example 400 of a resource center environment of the service provider that provides computing resources for a customer, in accordance with various embodiments. In the illustrated embodiment, a service provider (e.g., a cloud computing resource provider) can maintain one or more resource centers 423 (e.g., data centers, server farms, etc.) that store the physical resources (e.g., host servers, etc.) of the service provider. These physical resources can be used to host a number of virtual machine instances or virtual servers that can be provided to users 401 over a network 402, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like.

In the illustrated example, the resource center 423 of the service provider may include one or more racks 421, 422 of host servers (406, 407, 408, 409, 410) wherein each host machine on a particular rack is connected to a single top-of-rack (TOR) switch (404, 405). These TOR switches can be further connected to one or more other switches (424, 425) which enable the host servers to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host server can host one or more virtual machine instances (413, 414, 415, 416, 417, 418, 419) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance, the customer can first submit a request to the service provider, indicating the type of VM they would like to use. The service provider may carry out the processes to provision the virtual machine instance which will be hosted on the physical resources (e.g., host machines) of the service provider. The virtual machine instance can then be used to execute the various applications and services on behalf of the customer, utilizing the resources of the service provider.

Figure 4B:
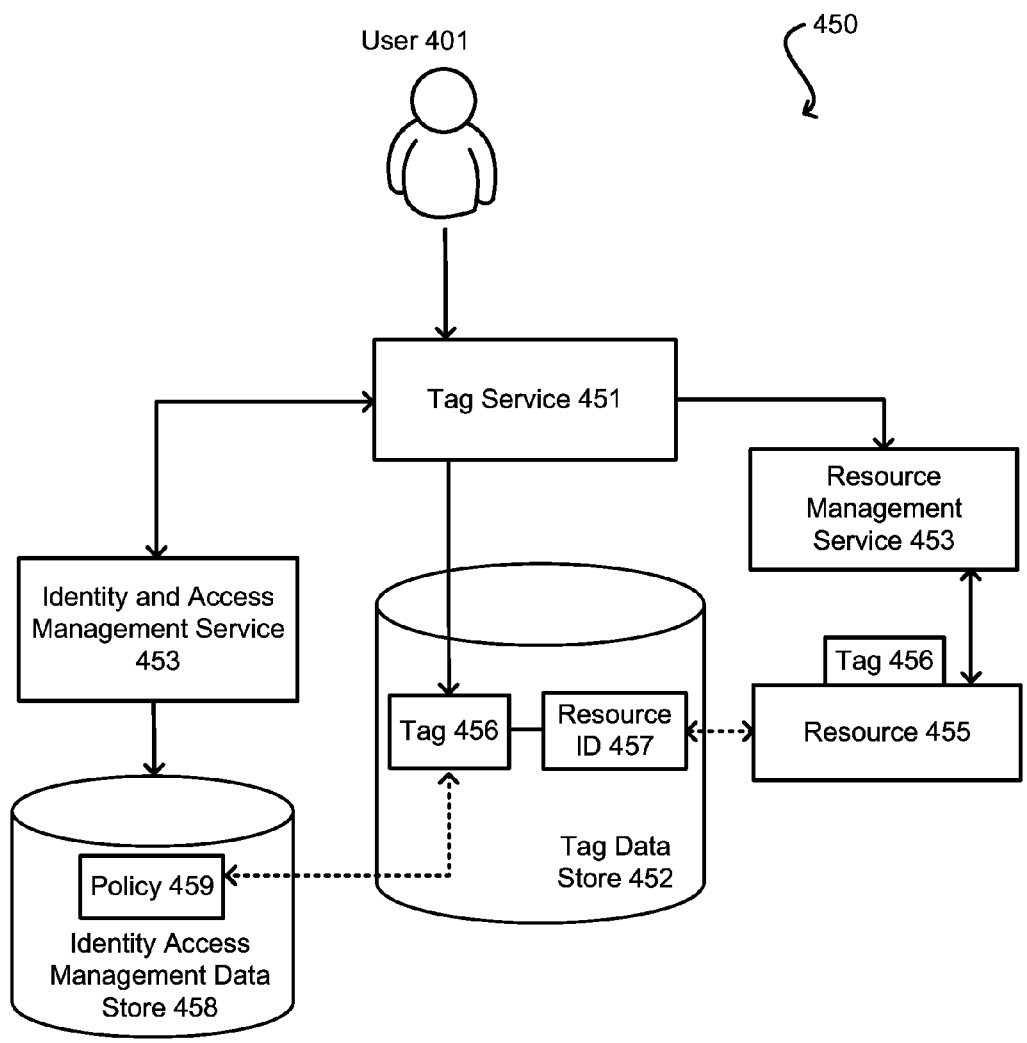
FIG. 4B illustrates an example of an environment showing a tag service and a tag data store that holds the tags, in accordance with various embodiments.

FIG. 4B illustrates an example of an environment 450 showing a tag service and a tag data store that holds the tags, in accordance with various embodiments. In the illustrated embodiment, functionality related to applying freeform metadata to computing resources can be effectuated by a tag service 451 (e.g., one or more computer systems operating together to implement a distributed system). In an example embodiment, the tag service 451 can be associated with a web server that implements an interface for tagging resources within the computing environment, such as resource 455. Here, the tag service 451 can receive requests for tagging resources from user 401 over a network (e.g., via an interactive console or other GUI provided by the environment), from an executing program of a user that automatically initiates the execution of other programs or other instances of itself, from programming tools (e.g., command-line tools, integrated development environments, etc.), from a program that interacts with the tag service via an Application Programming Interface ("API") provided by the environment (e.g., an API that uses Web services), and so forth.

In response to receipt of a request to tag a resource 455, the tag service 451 can generate freeform metadata indicative of the tag 456 and associate the tag 456 with an identifier 457 for the resource in a data store. In addition, the tag service 451 may store a timestamp of when the tag 456 was created, the identity of the user that created the tag 456, etc. For example, if a user uses a web-based console to create a tag "stack=production" the tag service 451 can create a data entry in the tag data store 452 including the key/value pair "stack=production." And when the user 401 associates the tag 456 with a resource 455, the tag service 451 can add a resource identifier 457 for the resource to the data entry. In an embodiment, after the relationship is persisted in the tag data store 452, the tag service 451 can send a message (e.g., a web-services request) to the service 453 that controls the resource and the service 453 can associate the tag with the resource. For example, supposing the resource 455 is a machine image used to launch a virtual machine, the tag service 451 can send a message to the service operable to manage machine images (e.g., resource management service 453) to add the tag 456 to the metadata of the machine image (i.e. resource 455) and the service 453 can apply the metadata.

In an embodiment where there are access control restrictions on the use of the tag, when the user 401 attempts to associate the tag 456 with the resource 455, the tag service 451 can call the identity and access management service 453 to verify that the user 401 has the requisite permissions to apply the tag 456 to the resource 455. In the instance where the user 401 is authorized to apply the tag 456 to the resource 455, the identity and access management service 453 can respond to the request with an acknowledgment and the tag service 451 can store the relationship in the tag data store 452.

In an embodiment where an access control policy can be associated with a tag 456, an administrator can use an interface effected by the web server (e.g., an interactive console) to create an access control policy 459 and associate the policy 459 with the tag. In response to the request, and assuming the user has the requisite permissions, the identity and access management service 453 can store the policy 459 in an identity and access management data store 458 in association with information indicative of the tag 456 (e.g., tag ID). The identity and access management service 453 can then send a message (e.g., a web-services request) to the tag service 451 to store an indicator of the policy or the policy itself in the tag data store 452. After the tag 456 is associated with a resource 455, it can be processed by the identity and access management service 453 to determine whether to deny or permit an action specified in a user request. For example, in the instance that a policy associates an action with a tag (e.g., Bob can delete resources tagged with "stack=production"), the identity and access management service 453 can determine whether the action specified in the request is a "delete" and whether the resource is tagged with "stack=production" (e.g., by reading the metadata associated with the resource) and either deny or grant the request. Similarly, when the tag 456 is associated with a policy 459, the identity and access management service 453 can read the metadata associated with the resource to detect the tag 456 and use the tag 456 to search the data store 458 associated with the identity and access management service 453 to find the policy 459 associated therewith and evaluate the policy 459 to determine whether to grant or deny the request.

Figure 5:
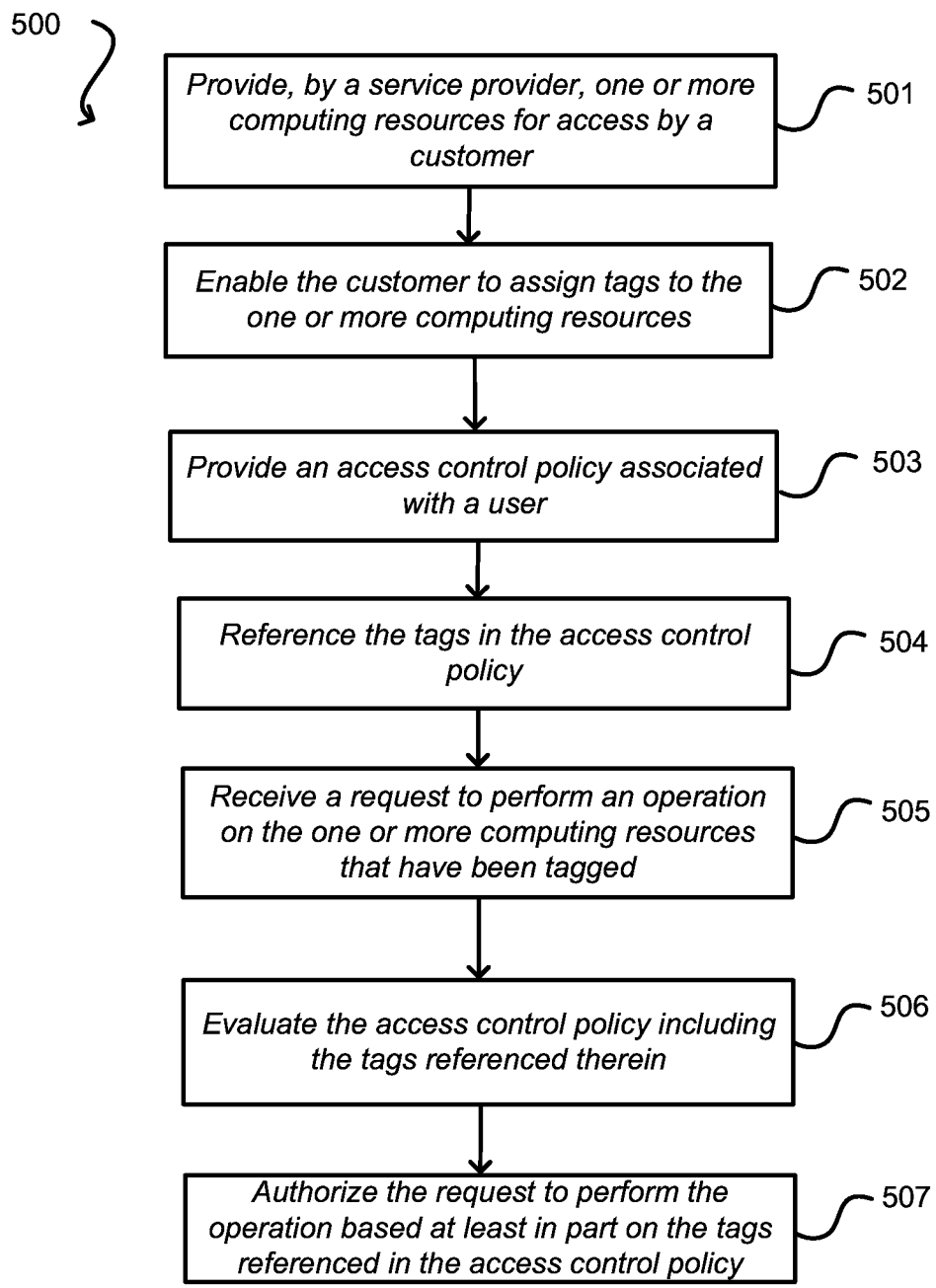
FIG. 5 illustrates an example process for allowing a customer to reference tags in access control policies, in accordance with various embodiments.

FIG. 5 illustrates an example process 500 for allowing a customer to reference tags in access control policies, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, the service provider provides one or more computing resources for access by a customer. The computing resources can include any hardware resources, software resources or combination thereof, including virtual machines, host computing devices, storage devices, applications, databases, interfaces and any other resource that can be utilized to provide a service on behalf of the customer.

In operation 502, the customer is enabled to assign tags to the one or more computing resources provided by the service provider. For example, the customer may tag certain virtual machines as production resources, while other virtual machines may be tagged as testing resources and the like. In some embodiments, each tag can consist of a key and a value. The key and the value can be associated with any given resource to provide information about that resource.

In operation 503, an access control policy is provided. In one embodiment, the access control policy is associated with a principal (e.g., user). In other embodiments, the access control policy can be associated with resources, tags and the like, as described throughout this disclosure.

In operation 504, the tags can be referenced (e.g., specified) in the access control policy associated with the user. In particular, the tag can be referenced in one or more conditions that control user access. For example, the policy may include a condition that the user is allowed to modify or delete any resource tagged with the tag "stack=testing".

In operation 505, a request is received from a user to perform an operation on the one or more computing resources that have been tagged. For example, the request may be an API call that requests the resource to be deleted.

In operation 506, the access control policy is evaluated, including the tags that have been referenced in the conditions. If the access control policy is evaluated to allow the user to perform the request, the operation is executed, otherwise the request is rejected or fails, as shown in operation 507.

Figure 6:
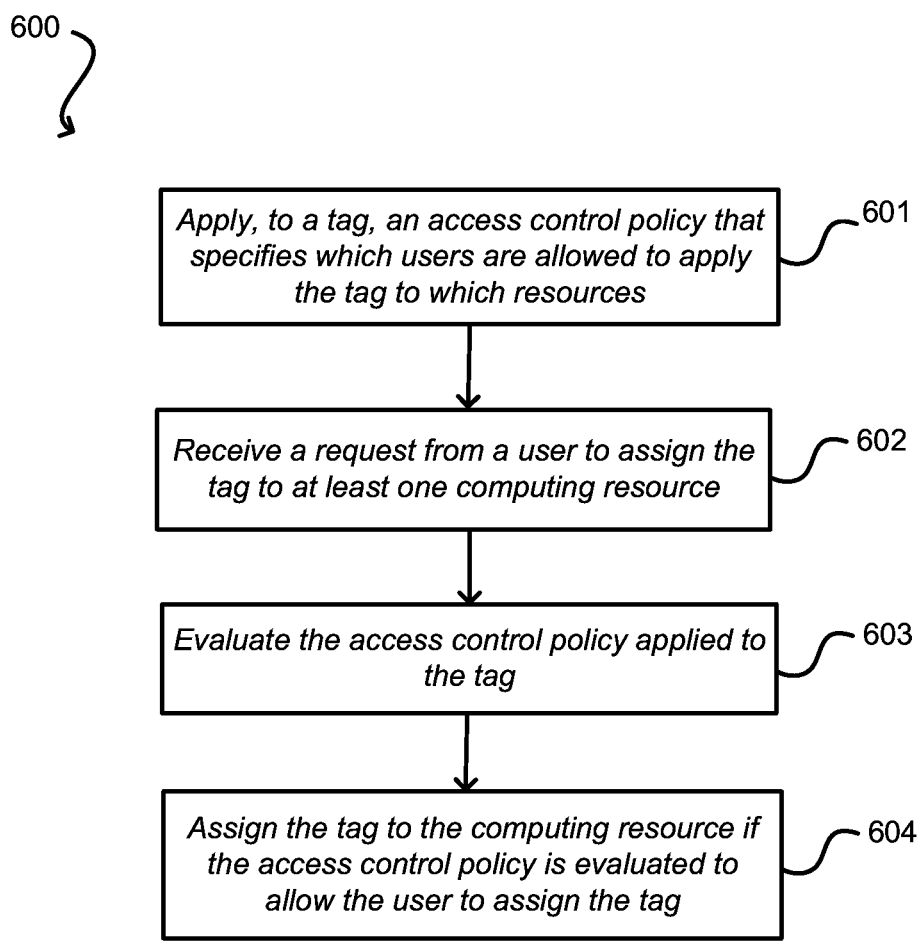
FIG. 6 illustrates an example process for utilizing access control policies to restrict the use of tags on resources, in accordance with various embodiments.

FIG. 6 illustrates an example process 600 for utilizing access control policies to restrict the use of tags on resources, in accordance with various embodiments. In operation 601, an access control policy is applied to a tag. The access control policy specifies which principals are allowed to apply the tag and to which resources they are allowed to apply it. In operation 602, a request is received from a user, requesting to assign the tag to at least one computing resource. In operation 603, the system evaluates the policy applied to the tag to determine whether to allow the user to assign the tag. In operation 604, if the access control policy allows the request, the tag is assigned to the computing resource. Otherwise, the request can be rejected or fail.

Figure 7:
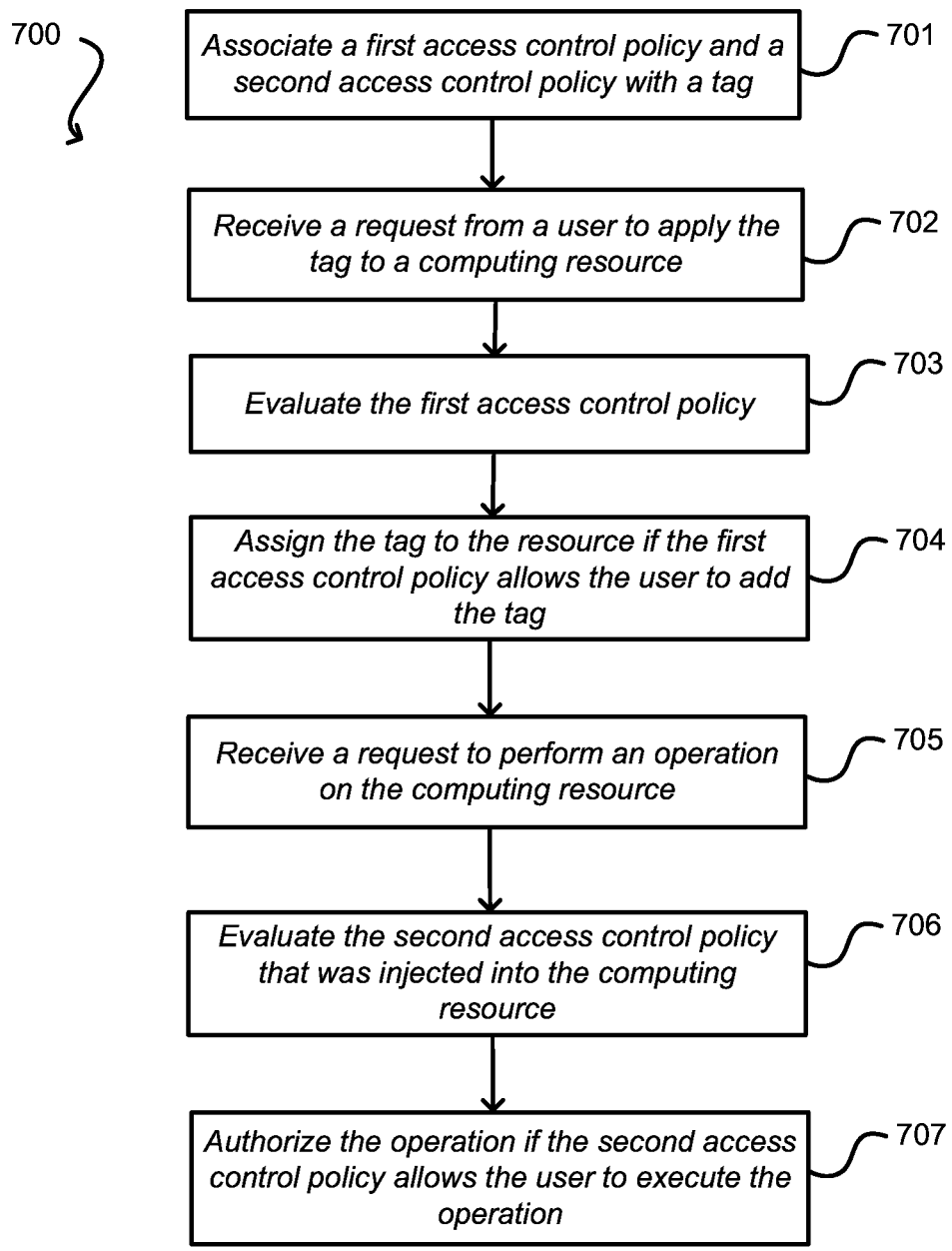
FIG. 7 illustrates an example process for associating an access control policy with a computing resource as a result of assigning a tag to that computing resource, in accordance with various embodiments.

FIG. 7 illustrates an example process 700 for associating an access control policy with a computing resource as a result of assigning a tag to that computing resource, in accordance with various embodiments. In operation 701, a tag is associated with a first policy and a second policy. The first policy can identify which principals are allowed to assign the tag to which resources, while the second policy identifies operations that are allowed to be performed on a computing resource that is tagged with that tag.

In operation 702, a request is received from a user to apply the tag to a computing resource. For example, the user may submit an API request to tag a virtual machine with the tag "stack=production". In operation 703, the system evaluates the first access control policy that specifies which users are allowed to apply this tag. In operation 704, if the first policy is evaluated to allow the request, the system assigns the tag to the computing resource.

In operation 705, a request is received to perform an operation on the computing resource. In operation 706, the system evaluates all of the policies related to the request, including the second access control policy that is associated with the tag. All of the policies are evaluated in order to perform authorization of the request to perform the operation. In operation 707, the request to perform the operation on the resource is authorized if the second access control policy is evaluated to allow the user to execute the operation.

Figure 8:
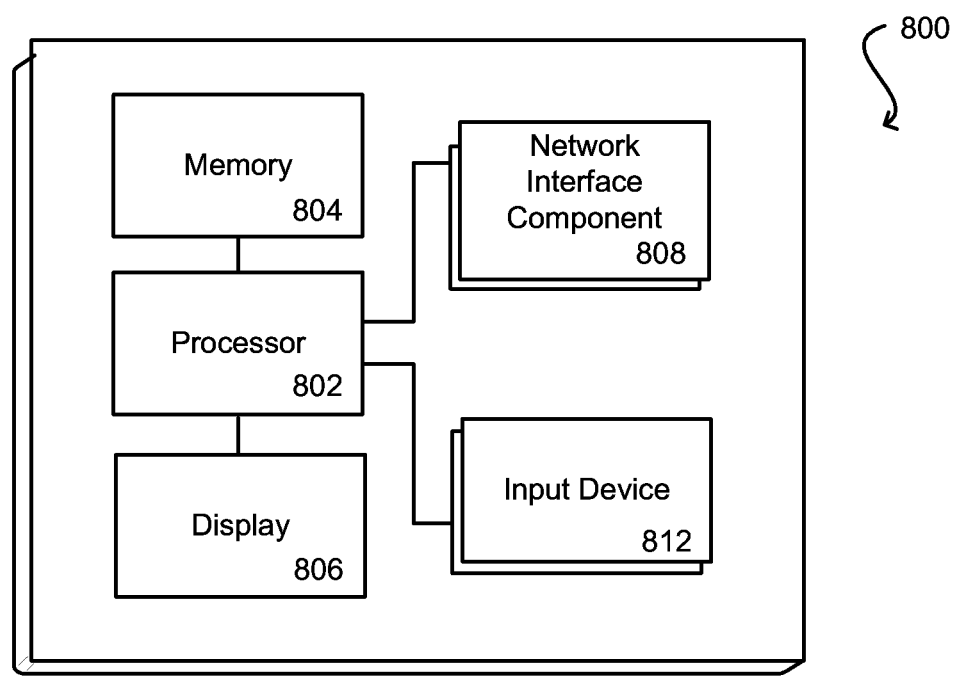
FIG. 8 illustrates a logical arrangement of a set of general components of an example computing device that can be utilized in accordance with various embodiments.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more network interface elements 808 for communicating over various networks, such as a Wi-Fi, Bluetooth, RF, wired, or wireless communication systems. The device in many embodiments can communicate with a network, such as the Internet, and may be able to communicate with other such devices.

Figure 9:
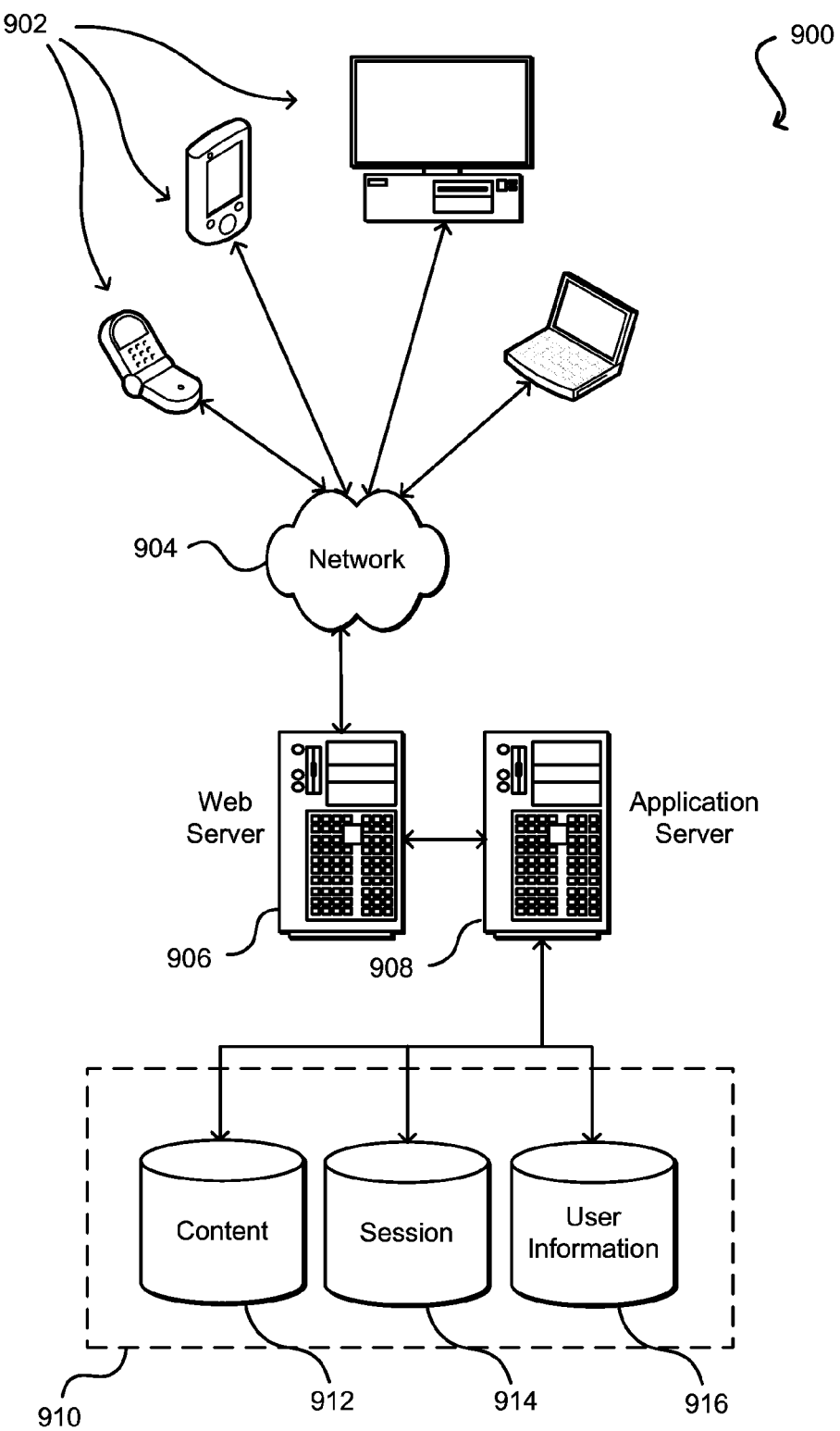
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising:
   receiving a request to associate a tag with a computing resource, wherein the tag comprises a key and an associated value;
   associating the tag with a computing resource in a multitenant environment operated by a service provider, the tag including a freeform character string specifying the key and the associated value;
   determining restrictions for accessing the computing resource based on a combination of the key and the associated value of the tag, the tag being associated with an access control policy;
   receiving a request to perform an operation on the computing resource;
   determining that the tag is associated with the computing resource;
   evaluating the access control policy, the access control policy referencing the tag as a condition for using the computing resource, referencing a user having an account with the service provider, and identifying an operation permitted to be executed by the user if the tag is associated with computing resource;
   determining that the user is permitted to authorize the operation based at least in part on evaluating the access control policy; and
   resolving the request to perform the operation.

2. The computer implemented method of claim 1, wherein the computing resource is:
   a virtual machine instance, a host computing device, an application, a storage device, a database, a virtual network including a plurality of virtual machines, or an interface.

3. The computer implemented method of claim 1, wherein the access control policy is created using a policy language.

4. The computer implemented method of claim 1, wherein resolving the request is performed by an identity access management service configured to:
   collect all access control policies that are related to the request to perform the operation; and
   evaluate all the access control policies to grant or deny the authorization to perform the operation, wherein evaluating is based at least in part on the tag associated with the computing resource.

5. The computer implemented method of claim 1, further comprising:
   providing, by a service provider, the computing resource to a customer of the service provider, the computing resource provided in a multitenant shared resource environment; and
   enabling the customer to assign the tag to the computing resource by invoking an application programming interface (API).

6. The computer implemented method of claim 1, wherein the access control policy is associated with at least one of: the user, a group of users, or the at least one computing resource.

7. A computing system, comprising:
   at least one processor; and
   memory including instructions that, when executed by the at least one processor, cause the computing system to:
      receive a request to associate a tag with at least one computing resource, wherein the tag comprises a key and an associated value;
      associate the tag with the at least one computing resource in an environment, the tag including a freeform character string specifying the key and the associated value;
      determine restrictions for accessing the at least one computing resource based on a combination of the key and the associated value of the tag, the tag being associated with an access control policy;
      receive a request to perform an operation on the at least one computing resource;
      determine that the tag is associated with the at least one computing resource;

evaluate the access control policy, the access control policy referencing the tag as at least part of a condition for performing the operation, referencing a user having an account with an operator of the environment, and identifying an operation permitted to be executed by the user if the tag is associated with the at least one computing resource;

determine that the user is permitted to perform the operation based at least in part on evaluating the access control policy; and resolve the request to perform the operation.

8. The computing system of claim 7, wherein the at least one computing resource further includes one or more of: a virtual machine instance, data stored in a data storage service, an application, a storage device, a database, a virtual network including a plurality of virtual machines, or an interface.

9. The computing system of claim 7, wherein the tag is referenced in the condition by using a policy language that can be used to express the access control policy.

10. The computing system of claim 7, wherein controlling authorization is performed by an identity access management service configured to:

collect all access control policies that are related to the request to perform the operation; and evaluate all the access control policies to grant or deny the authorization to perform the operation, wherein evaluating is based at least in part on the tag associated with the at least one computing resource.

11. The computing system of claim 7, wherein the access control policy is associated with at least one of: the user, a group of users, or the at least one computing resource.

12. The computing system of claim 7, wherein the memory further comprises instructions that, when executed by the at least one processor, causes the computing system to:

provide, by a service provider, the at least one computing resource to a customer of the service provider, the at least one computing resource provided in a multitenant shared resource environment; and enable the customer to assign the tag to the at least one computing resource by invoking an application programming interface (API).

13. A non-transitory computer readable storage medium storing one or more sequences of instructions executable by one or more processors to perform a set of operations comprising:

receiving a request to associate a tag with at least one computing resource, wherein the tag comprises a key and an associated value;

associating the tag with the at least one computing resource in a multitenant environment operated by a service provider, the tag including a freeform character string specifying the key and the associated value, determining restrictions for accessing the computing resource based on a combination of the key and the associated value of the tag, the tag being associated with an access control policy;

receiving a request to perform an operation on the at least one computing resource;

determining that the tag is associated with the at least one computing resource;

evaluating the access control policy, the access control policy referencing the tag as at least part of a condition for controlling access to the at least one computing resource, referencing a user having an account with the service provider, and identifying an operation permitted to be executed by the user if the tag is associated with the at least one computing resource;

determining that the user is permitted to perform the operation based at least in part on evaluating the access control policy; and resolve the request to perform the operation.

14. The non-transitory computer readable storage medium of claim 13, wherein the at least one computing resource further includes one or more of:

a virtual machine instance, a host computing device, an application, a storage device, a database, a virtual network including a plurality of virtual machines, or an interface.

15. The non-transitory computer readable storage medium of claim 13, wherein the access control policy is created by using a policy language.

16. The non-transitory computer readable storage medium of claim 13, wherein controlling authorization is performed by an identity access management service configured to:

collect all access control policies that are related to the request to perform the operation; and evaluate all the access control policies to grant or deny the authorization to perform the operation, wherein evaluating is based at least in part on context information associated with the request and the tag associated with the at least one computing resource.

17. The non-transitory computer readable storage medium of claim 13, wherein the access control policy is associated with at least one of: the user, a group of users, or the at least one computing resource.

* * * * *